May 5, 1964  R. G. DURRSCHMIDT  3,131,491

SNOWBLOWING ATTACHMENT FOR POWERED LAWN MOWERS

Filed March 21, 1962

INVENTOR.
RALPH G. DURRSCHMIDT
BY James H. Conner

AGENT.

United States Patent Office 3,131,491
Patented May 5, 1964

3,131,491
SNOWBLOWING ATTACHMENT FOR
POWERED LAWN MOWERS
Ralph G. Durrschmidt, 24 Martin Lane, Westbury, N.Y.
Filed Mar. 21, 1962, Ser. No. 181,319
2 Claims. (Cl. 37—43)

This invention relates generally to auxiliary devices for conventional powered lawn mowers and more particularly to a snow-throwing attachment adapted to be removably mounted on existing conventional gasoline engine powered lawn mowers.

At present, snow removal machines of the type for home snow removal use employ self-contained power units. Obviously, such snow removal machines are relatively expensive and beyond the means of the average small home owner. Yet, the average small home owner possesses a powered lawn mower. Thus, a snow removal attachment for existing powered lawn mowers may be manufactured at a much lower cost than the self-contained powered snow machines. Accordingly, one of the principal objects of the invention resides in the provision of an attachment for conventional powered lawn mowers for utilization on snow removal from driveways, sidewalks and the like.

Another object of the invention is to provide adjustable means for readily attaching and removing a snow-blower attachment of the class described to and from a conventional powered lawn mower.

Still another object is to provide speed responsive means that removes the additional load of the attachment from the powered lawn mower while starting the gasoline engine of the power mower and couples the snow removal attachment to the power mower engine when the speed of the engine reaches a normal operating revolutions per minute.

Yet another object is to provide in an attachment of the class described, means for selectively controlling the direction that the snow is to be thrown by the attachment.

Other ancillary objects will be in part hereinafter pointed out and will be in part hereinafter apparent.

Figure 1:
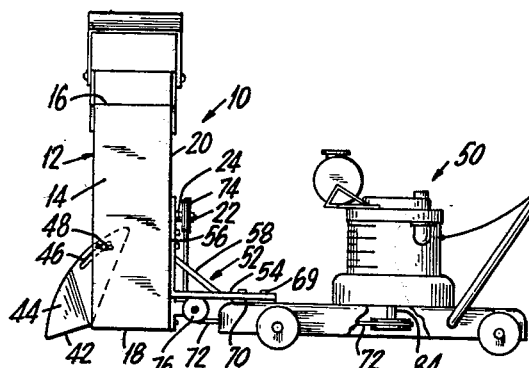
FIGURE 1 is a side elevation of the snow blowing attachment mounted on a conventional rotary-type powered lawn mower.

Referring to the drawing in detail 10 generally designates the snow blower attachment which comprises a sheet metal housing 12 having side walls 14, top and bottom walls 16 and 18 respectively and a rear wall 20. A shaft 22 is journalled in bearing 24 supported in a mounting plate 26 centrally mounted on rear wall 20. Shaft 22 extends through wall 20 and affixed to the inner portion of said shaft is a diametrically opposing C-channel blade member 28. Secured to and rotatable with blade member 28 is a disc 30, provided for a purpose hereinafter appearing. Intermediate disc 30 and rear wall 20 on shaft 22 is a washer 32 that abuts against bearing 24. Blade member 28 is provided with a pair of oppositely extending scoops 34 that facilitates the cutting action of the blade into snow.

Figure 2:
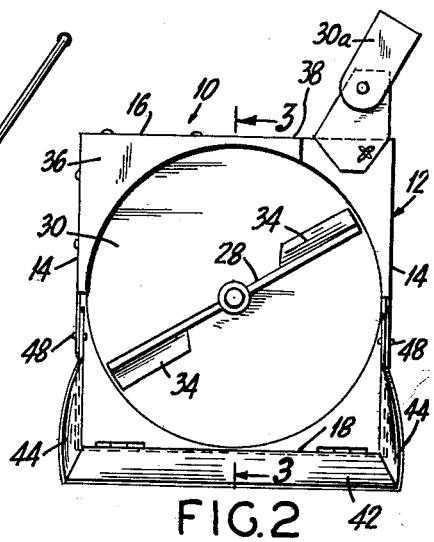
FIGURE 2 is a front elevation of the attachment.
Figure 4:
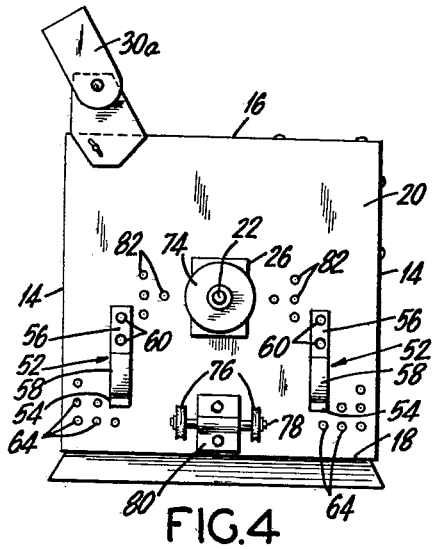
FIGURE 4 is a rear elevation of the attachment with the lawn mower omitted to more fully illustrate the universal mounting means.
Figure 3:
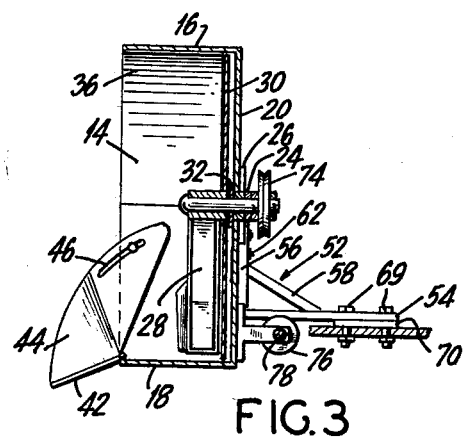
FIGURE 3 is a cross sectional view taken along line 3—3 of FIGURE 2.
Figure 5:
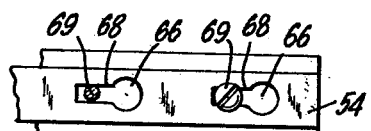
FIGURE 5 is a detail of the attaching means for rapid attachment and removal of the housing from the lawn mower body.

As shown in FIGURES 2 and 3, an arcuate filler section 36 is affixed to the upper wall 16 and the left hand side wall 14. Section 36 overlaps disc 30 and is formed with a radius that permits blade 28 to clear and rotate past said section. Section 36 further terminates adjacent to the chute opening 38 in top wall 16. An adjustable chute 30a is secured in chute opening 38 to direct the snow thrown by blade member 28 to the side as desired.

Hinged to the lower wall 18 is a plate 42 having vertically extending wing portions 44 at each end thereof. Wing portions 44 are each provided with an arcuate slot 46 through which a bolt 48 passes. Plate 42 and wing portions 44 are thereby adjustable to ground level after the attachment 10 has been mounted on the lawn mower 50.

Means are provided to attach the snow thrower to mower 50 and directed toward this end are a pair of brackets 52 each having a longitudinal body portion 54, a vertical arm 56 upwardly extending from one end of body 54 and a reinforcing strap 58 welded to arm 56 and body 54. Arm 56 is provided with a pair of spaced apertures 60 in which bolts 62 are inserted. Bolts 62 are selectively inserted in corresponding apertures 64 provided in rear wall 20 and the appropriate arm 56 secured thereto. In a similar manner the other bracket 52 is affixed to rear wall 20. The plurality of apertures 64 provided in rear wall 20 permits variations of mounting of brackets 52 to correspond to the particular mower 50 which the snow blower 10 is to be attached. Each body 54 is also provided with a pair of apertures 66 that communicate with slots 68. A pair of headed studs 69 extend vertically from a plate 70 that is permanently attached to the body of mower 50. Thus, each bracket 52 may be inserted over studs 69 and moved rearwardly to position the studs 69 in slots 68. For removal of the snow blower attachment 10 from mower 50, the attachment 10 is moved forwardly and raised over the studs 69.

A ribbed belt 72 transmits the power of the mower 50 to the attachment 10. A pulley 74 is secured to shaft 22 of the snow blower attachment. A pair of spaced idler pulleys 76 affixed to shaft 78 journalled in bearing block 80 are adapted to receive drive belt 72 thereon and angularly guide the belt to the drive shaft of mower 50. Bearing block 80 is similarly bolted to rear wall 20 by use of bolts and selective apertures 82. Thus, the idler pulleys 76 may be variably mounted, on rear wall 20, as required by the particular mower 50 to which the attachment 10 is attached.

Coupling the belt 72 to the drive shaft 84 of mower 50 is a speed responsive clutch 90. The cutting blade, not shown, normally secured to drive shaft 84 is removed at the end of the summer and the clutch 90 is substituted therefor. Clutch 90 comprises an outer shell 92 formed with a peripheral groove to receive belt 72 therein. The inner hub 94 affixed to drive shaft 84 is provided with a pair of diametrically opposite arms 96 which pivotally secure the respective clutch bands 98. A spring 100 secured to the free end of each band 98 is anchored on an adjustable screw threadedly mounted on the opposite arm 96 to adjust the throw out speed of each clutch band. Thus, the gasoline engine of mower 50 is permitted to start without load and when the normal operating speed is attained, each clutch band 98 pivots away from its respective arm 96 and engages the drum surface of the outer shell 92 and rotates said shell and belt 72 thereon. The belt 72 transmits power to rotary blade member 28 of attachment 10 and the snow removing operation is initiated.

The operation of the snow attachment is well known to those skilled in the art. Briefly, the attachment 10 is directed into a pile of snow. The rotating blade 28 engages the snow and carries the engaged snow in the direction of the arrow, FIGURE 2. The carried snow is thrown out of chute 30a and deflected in the desired direction.

For convenient storage between snow storms, the belt 72 may be removed from clutch 92 and the attachment 10 removed from studs 69 on mower 50. It will be noted that belt 72 retains attachment 10 on the mounting studs 69. At the end of the snow season, the clutch 92 is removed from mower drive shaft 84 and the grass cutting blade, not shown, is mounted for subsequent lawn maintainance operations.

Figure 6:
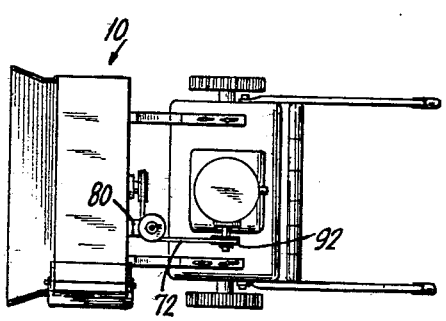
FIGURE 6 is a plan view of the snow blower attachment mounted on a conventional reel-type gasoline engine powered lawn mower.
Figure 7:
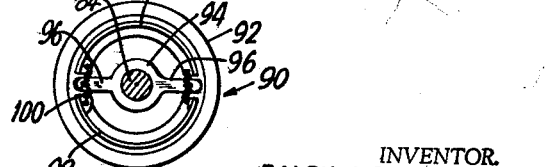
FIGURE 7 is a detail view of the speed responsive clutch.

It will be noted that the substantially universal mounting of brackets 52 and the idler pulley block 80 permits adaptation of the attachment 10 to the majority of conventional gasoline powered lawn mowers. As shown in FIGURE 6, the attachment 10 is mounted on a reel-type conventional gasoline powered lawn mower. In this instance the idler pulley block 80 is mounted on attachment 10 on substantially the same horizontal plane as the pulley 74, while the clutch 92 is affixed to the motor drive shaft in the appropriate corresponding relation.

While there has been shown and described a single embodiment of the invention, it will be understood that many modifications and changes could be made without departing from the scope of the invention as set forth in the following claims.

The invention claimed is:

1. The combination of a conventional gasoline engine powered lawn mower with a snow blowing attachment, comprising, a housing, means for adjustably mounting said housing on the lawn mower, rotary means adapted to engage snow and throw the engaged snow through a chute in said housing, speed responsive clutch means mounted on the drive shaft of the lawn mower gasoline engine, and belt means for connecting said rotary means to said speed responsive clutch means and retaining said housing on said lawn mower.

2. The combination of a conventional gasoline engine powered lawn mower with a snow blowing attachment, comprising, a housing, means for adjustably mounting said housing on the lawn mower, rotary means adapted to engage snow and throw the engaged snow through a chute in said housing, speed responsive clutch means mounted on the drive shaft of the lawn mower gasoline engine, belt means for connecting said rotary means to said speed responsive clutch means and retaining said housing on said lawn mower, and said adjustable mounting means including detachable mounting means for detaching said adjustable mounting means from the lawn mower when said belt means is disconnected from the speed responsive clutch means.

References Cited in the file of this patent

UNITED STATES PATENTS

| | | |
|---|---|---|
| D. 186,948 | Anderson | Dec. 29, 1959 |
| 20,368 | Pusey | May 25, 1858 |
| 2,420,100 | Salsbury | May 6, 1947 |
| 2,695,071 | Hupp | Nov. 23, 1954 |
| 2,712,211 | Smith et al. | July 5, 1955 |
| 2,770,893 | Jacobs | Nov. 20, 1956 |
| 2,797,502 | Griffith et al. | July 2, 1957 |